United States Patent Office 2,799,912
Patented July 23, 1957

2,799,912

PROCESSES FOR FORMING HIGH TEMPERATURE CERAMIC ARTICLES

Herbert Hans Greger, Rockville, Md.

No Drawing. Application December 18, 1950,
Serial No. 201,483

2 Claims. (Cl. 25—156)

(Granted under Title 35, U. S. Code (1952), sec. 266)

The present invention relates generally to the fabrication of molded high temperature ceramic articles, and more particularly to a process and compositions for the manufacture of carbide-bonded, boride-bonded, or similarly bonded articles of metal carbides, borides, and like compounds by sintering, wherein the bond for the base particles is formed in situ during the process of manufacturing the articles. The present invention is concerned in its principal application with compounds generally referred to as hard carbides and hard borides, which term is herein used to refer to the carbides and borides of metals of groups IVB, VB, and VIB of the periodic system (particularly titanium, zirconium, hafnium, thorium, vanadium, columbium, tantalum, chromium, molybdenum, and tungsten) and in addition thereto, boron.

Hard carbides are used as abrasives and in the manufacture of high speed cutting tools. At present, a conventional method of preparing carbide shapes for these purposes is by bonding the carbide grain with a high melting glass or metal or the like. These conventional binders, however, have a very low melting point compared with those of the carbides themselves, and consequently fail at low temperatures relative to what the carbides themselves can withstand. In order to take advantage of the hard carbide high melting points, the present invention provides a process for bonding these high temperature carbides with their own or some other similar hard carbide. In this manner a self-bonded or carbide-bonded carbide shape is produced free from extraneous binder, which may be used at any temperature which the carbides themselves can withstand.

The hard carbides, carbides of the metals above indicated, have melting points in excess of 2000° C., some even in excess of 3000° C., and these high melting points are shared with the nitrides and borides of most of the mentioned metals. Attempts have been made to sinter these high temperature materials themselves into molded articles; however, they offer considerable resistance to sintering, which may be overcome only when heat treated at temperatures approaching their melting points. The close proximity of their sintering temperatures to their melting points and the resultant lack of sufficient temperature range between sintering and melting causes considerable difficulty in such a direct approach, and this difficulty is made more severe by the extremely high temperatures involved and the poor means presently available for close temperature control and measurement in these ranges.

One process presently employed for sintering hard carbide grains is to press form finely divided carbide powder having intermixed therewith a suitable quantity of an organic binder, such as Carbowax. The binder is then removed by heating, leaving a fragile compact of carbide which becomes denser and obtains strength as the heating temperature is increased. There are certain disadvantages connected with a fabricating method of this type. The method is limited mainly to pressed compacts of very simple shape. After removal of the wax they become very fragile, which is a very undesirable condition in commercial manufacture, particularly since in some instances it is very desirable to provide for a final forming step intermediate the initial forming and final firing. In such instance, it is necessary to bisque fire or sinter the compact at very high temperatures to obtain a sufficient hardness where grinding with conventional means is possible.

Certain improvements over the above sintering method have been obtained by the addition of small quantities of metal, such as cobalt or nickel powder, which causes the carbide to sinter at lower temperatures. The added metal is subsequently volatilized in vacuum at high temperatures, thus leaving the pure carbide. Yet even this improvement is cumbersome and of limited flexibility for commercial practice.

The difficulties and limitations of current practices are essentially avoided and overcome by the process of the present invention. Considerable freedom is obtained not only in forming the compact, but also in the final properties of the article by a suitable choice of molding compositions compounded in accordance with chemical equivalents and ratios demanded by reactions which develop during the stages of heat treatment. Furthermore, the initial forming methods are not confined to dry pressing of the molding compositions, but the forming may also be accomplished in the plastic state, and even slip casting in plaster or paper molds may be had. Also, very high accuracy is obtained in the form and dimensions of the final article produced.

In accordance with one embodiment of the present invention, where a dense carbide article is sought, the desired carbide as a filler and an appropriate quantity of a reactant constituting an oxide of a metal which forms a hard carbide, are mixed with a suitable quantity of temporary binder for intially forming the carbide article. If a porous carbide product is desired, a reactant constituting the metal itself of the above indicated metal oxide is substituted therefor. The binder should be of such composition that it decomposes to leave a carbon residue on being heated. Hard pitch plasticized with tar has been found suitable as a temporary binder for the present process, although other binders of the thermoplastic or thermosetting type can be used. After the article is formed and its binder has been carbonized, it is of sufficient strength to permit a further or final shaping by conventional grinding or other machining means. Thereafter, the shape is further heat treated under controlled conditions to produce, in the case of the oxide reactant, the oxycarbide of both the reactant and the carbide filler ingredient, which subsequently liberates its oxygen in combination with the carbon binder to leave a sintered carbide article composed essentially wholly of carbides. In the case of the metal reactant, the heat treatment results in a direct formation of reactant metal carbide which sinters with the basic carbide ingredients to leave again a sintered carbide-bonded carbide article composed essentially wholly of hard carbides. If desired, a hard boride filler may be used in place of the hard carbide to produce a carbide-bonded boride.

In accordance with another embodiment of the present invention, a hard boride filler may be mixed with an oxide of a metal capable of forming a hard boride together with boron carbide as the reactants, and a suitable temporary binder decomposable on heating to a carbon residue is also mixed therewith. This mixture is then heat treated in the same manner as for the previously indicated embodiment to yield products of similar properties. In the instant embodiment however, the oxygen of the metal oxide combines with the carbon residue of the binder and the carbon of the boron carbide to remove both elements from the composition, and as a part of this reaction the boron from the boron carbide combines with the metal of the oxide to produce a boride-bonded boride article composed essentially wholly of borides.

Broadly stated, therefore, the present invention may be characterized as a process for producing hard carbide or hard boride ceramic articles, wherein as a first stage in the production of such articles a hard carbide or boride filler is temporarily bonded by carbon, and then the carbon is reacted with a metal or metals capable of forming hard carbides or borides or compounds of such a metal or metals so as to form in situ a hard carbide or boride bond for the filler, leaving the final article essentially wholly composed of hard borides and/or hard carbides, as the case may be. And in addition, the present invention further contemplates as within its scope the several compositions essential to carrying out the processes here indicated to the desired ends.

It is therefore one object of the present invention to provide a method of fabrication of carbide- or boride-bonded articles of carbides or borides.

Another object of the present invention is to provide a method of manufacturing precision formed hard carbide articles.

A further object of the present invention is to provide for the control of the porosity in these carbide shapes, ranging from practically zero to close to 50 percent.

Another object of the present invention is to provide a process for producing boride- or carbide-bonded hard boride or carbide articles, wherein a carbon binder for the initial hard boride or carbide is formed in an intermediate stage of the process of sufficient strength to enable machining or grinding if necessary to complete the shape of the article.

Another object of the present invention is to provide a process for producing boride- or carbide-bonded hard boride or carbide articles, wherein a carbon binder for the original carbide or boride is formed in an intermediate stage of the process and which is subsequently reacted with other constituents of the article to produce the carbide or boride bond.

Another object of the present invention is to provide compositions which can be molded and processed in accordance with methods herein described for the production of shaped boride or carbide articles bonded by carbides or borides formed in situ.

Still another object of the present invention is to provide a process for producing carbide or boride articles of accurate dimensions without need for refinishing.

Other objects and advantages of the present invention will become apparent to those skilled in the art from a consideration of the following detailed description thereof, given by way of example to more fully explain the concepts thereof.

For the purpose of clarity, in the further description here made of the present invention titanium is occasionally utilized as a typical example of a metal which forms a hard carbide. As will become apparent during the following description of the present process, the initial molding composition is an important part of the invention, because the end product and the proper functioning of the process depends to a large measure on the chemical ratios and reactions of the constituents in the molding mixture.

To form the initial carbide article by dust pressing, a dry fine mixture of a binder, as above described, reactant, and the desired carbide or boride filler is used, and through the addition of a suitable binder solvent the initial article may be formed in a plastic state. By increasing the amount of binder solvent used the article may be formed by casting. The formed shapes are then subjected to a slow process of heating to set the binder and transform the pitch binder into coke. The pitch being thermoplastic, the formed shape will distort if the coking is not done under carefully controlled gradual temperature increases. Between about 300 and 600° C. the binder is decomposed, gas and tar is evolved, and it sets into a hard carbonaceous residue which is sufficiently strong for further ordinary handling, machining, or grinding. Further gaseous substances are given off up to a temperature of about 1000° C.; so for the removal of most of these gaseous constituents it is desirable to continue the coking about 600° C., at least to 700–800° C. The shapes which are thus produced are true in dimension and contour. Occasionally, for simplification of molding dies and pressing operations the final shape may be developed after coking through grinding or machining. The articles thus formed are then heat treated in the temperature range of 1800–2500° C. to obtain transformation of the carbon bond into a carbide or boride by reaction of the carbon with the reactant. This heating cycle should be as rapid as possible, and usually lasts from 20 to 30 minutes.

In the fabrication of dense carbide-bonded carbide shapes, it is important that maturity be possible at temperatures below 2500° C. For this purpose, a fluxing reactant is used in the mixture in the form of an oxide; for example, a molding powder of titanium carbide may contain titanium dioxide as the reactant, or the oxide of another hard carbide forming metal. The hard carbides, such as titanium carbide, apparently have the ability to absorb oxygen into their crystal lattices in a solid solution of oxide and carbide. These oxycarbides are quite stable even at high temperatures, but are reduced by carbon to carbide. The oxycarbides apparently develop plastic properties at roughly 2000° C. with a fairly extensive plastic range (over several hundred degrees centigrade). This range and the degree of plasticity is governed by the concentration of oxygen, and the rate of reduction of the oxycarbide to carbide. Both these factors are evidently dependent on time and temperature, in that a very short heating cycle causes maximum retention of oxygen at the highest feasible temperature and thus causes a maximum of plasticity and consequent tendency towards shrinkage and high density. If, for example, the temperature is held at 1800° C. for any length of time, the reduction of the oxycarbide proceeds slowly, but to a sufficient degree to prevent the development of a degree of plasticity on heating above this temperature as to produce a dense structure. The carbides in this process thus become in behavior very similar to ceramic materials of a more conventional type and firing property, which has the advantage of typing these materials into the established concepts of this industry. It is apparent that to obtain the oxycarbide, the oxide reactant should present good stability in contact with carbon at relatively low temperatures to prevent oxides of carbon from forming prior to the oxycarbide. It is fortunate that only at high temperatures are the lower oxides of polyvalent metals which form hard carbides reduced by carbon at an appreciable rate, thus facilitating diffusion of the oxygen into the carbide filler.

The amount of metal oxide reactant in the molding mixture is so adjusted that the metal and oxygen contained therein present the theoretical equivalent necessary to consume all free carbon in the coked bond of the grain and any graphite that may be otherwise present in the article. The reaction products are carbon monoxide and reactant metal carbide formed in situ during the process. It has been found that best results for this reaction are obtained by very rapid heating of the coked article, so that the oxygen is not eliminated too rapidly as carbon monoxide before it has had a chance to form the oxycarbide and cause the desired plastic condition in the article. From numerous experiments it seems likely that a certain minimum temperature is needed to obtain the desired results. The optimum temperature range is 2000–2300° C. for titanium carbide filler, but varies somewhat with the type of carbide used. By contrast, it may be mentioned that a compact comprising —325 mesh titanium carbide formed without a fluxing reactant, requires a maturing temperature well in excess of 2500° C. for the formation of a nearly dense product. The sintering range is so narrow that melting may occur due to difficulties in the control of temperature ceilings.

When high porosities to nearly 50% are desired, essentially the same processing method is used except that the bonding carbide is formed in situ either entirely or partly from free metal powder, such as titanium, and carbon. The formation of the carbide in the present instance appears to begin at temperatures of about 700° C. and increases in velocity as the temperature is increased. A considerable amount of heat is thereby developed which is sufficient to cause the reaction to become self-accelerating in a very violent manner under a temperature rise which may exceed 2000° C. within a few seconds. In several instances, a temperature of 2300° C. was measured with an optical pyrometer. This heat can be used for curing these compacts, but a disadvantage of this method of curing is the occurrence of some variation in uniformity of the product. Where a high uniformity in pore structure, pore volume, or density of product is desired, a technique is followed which conforms very closely to that used in coking; that is, by continuing a slow temperature rise as used during the coking period to approximately 1300° C., a slow and smooth reaction takes place between reactant metal and carbon. At that temperature, the reaction is not entirely complete, but is sufficiently advanced to prevent a further violent temperature increase. The compacts thus prepared may be first ground to dimension after coking, but are further treated by heating in an induction furnace or the like to 1800–2500° C. An addition of silicon may be made in the initial molding composition, which increases the strength of the compact at lower temperatures (1300° C.) and increases the porosity when it is vaporized out at high temperatures.

The following discussion clearly illustrates the details by which the present process for fabrication of shaped carbide-bonded carbide or boride articles may be satisfactorily carried out. It is very important that the initial molding mixture be very homogeneous to prevent the formation of strains and other defects in the final product. A combination of mixing steps has shown satisfactory results. The dry powdered materials comprising the molding composition of carbide or boride filler, reactant, and temporary binder are first mixed in dry condition, then put through a micropulverizer to break up agglomerated particles, as are sometimes found in the oxide constituents or in the pitch. Then tar and solvent are added and the resultant slurry thoroughly agitated to dissolve and distribute the tar and pitch. Examples of such solvents are toluene, xylene, etc. The ingredients can also be hot mixed in a pan type mixer fitted with heavy mullers if the batch is large enough for such an operation. In hot mixing, the amount of solvent can be eliminated or kept at a minimum. After thorough mixing, the solvent is evaporated, and on cooling leaves a mass consisting of hard granules which are pulverized in a hammer mill to a fine powder passing a 100-mesh screen. The powder thus produced is then ready for molding.

The powder lends itself to both dry pressing and hot pressing operations, though cold molding is preferred whenever possible as the technique is simpler. It has been found, however, that evacuation of the mold before pressing is of considerable importance in preventing the formation of laminations and closed pores, and that the application of vibration during pressing results in improved homogeneity and the elimination of spongy sections in the center.

As a binder, a grade of pitch should be employed which is hard enough to be pulverized in a hammer mill to a fine powder. A suitable pitch for this purpose has a melting point of about 300° F. This material lacks the necessary plasticity for cold pressing and is for this reason plasticized with water free coal tar of a specific gravity of 1.2. A very desirable flexibility for the adjustment of plasticity results from this combination.

When the pitch and tar mixture is subjected in a pressed carbide or boride compact to a very slow process of heat treatment or coking, tar vapor and gas are given off. The pitch becomes plastic, but as the temperature increases and decomposition progresses, the plasticity decreases until at about 500° C. a solid residue is left which is still rich in gaseous constituents. These can be eliminated by further heating to 900–1000° C., but for most purposes heating to about 750° C. is sufficient. When molded carbide or boride compacts are coked, a definite heating schedule must be maintained, and the increase in temperature must be slow enough to prevent deformation or bloating. A 25° C. increase per hour up to 500–600° C. has been found satisfactory for most purposes. Once above this temperature range, a higher rate of increase, for instance 50° C. per hour, may be maintained. Large shapes must be heated more slowly than small ones, because the gases have to travel a longer distance to reach the surface. This coking is best accomplished in an electric muffle furnace, a crucible, or a steel tube in an inert or reducing atmosphere, to prevent oxidation of the bond.

The equipment for molding is of conventional design. The press should be fitted with a heavy vibrator of sufficient force to be effective at a pressure of about 5 tons per square inch. The pressure may be increased further up to about 20–30 tons if necessary. Molding in plastic or liquid condition also follows essentially conventional lines. The molding composition is the same as described for dry pressing, but an added amount of solvent imparts further plasticity or fluidity. After forming, the solvent is evaporated slowly in much the same manner as water is left to evaporate from conventional ceramic compositions. When forming by slip casting is undertaken, the amount of pitch has to be larger than usual to compensate for the amount of pitch which is carried by the solvent into the mold. The initial porosity of cast or plastic formed specimens is somewhat higher than those produced by dry pressing, but after drying may be subjected to the same coking and further heat treatment.

In many cases, the carbide compacts can be molded to the desired shape, and dimensions by allowing for shrinkage. There is practically no shrinkage in the process of coking, but there is usually considerable shrinkage during the subsequent firing step at high temperatures. Where the contours of the shape are complicated, it is desirable to confine the original molding to simpler form and then coke the shape and subsequently give it the final form by machining and grinding. The coked shapes have the strength and the necessary properties for this operation. By careful determination of the shrinkage and by allowing for it, tolerances as high as ±.002 inch were consistently obtained in some cases. This accuracy is unusual for ceramic methods, but it is very important as grinding of dense carbide or boride articles would not only be expensive but diamond tools would have to be used, and these have a strategic value in the event this country is cut off from supplies of diamonds abroad. The accuracy and consistency of results of the fabricating method accomplishes one of the important objects of the invention.

In the formation of dense articles, the further heat treatment after coking is carried out by any method that permits very rapid heating in an atmosphere that will not contaminate the product, as for example, in an atmosphere of carbon monoxide, hydrogen, helium or argon. In many instances, carbon monoxide in a graphite crucible will be found satisfactory. This heat treatment can be accomplished very readily in an induction furnace fitted with a carbon crucible and insulated with carbon black in a manner which is standard for this type of work. By suitable choice of conditions, a very rapid heating to about 2500° C. can be accomplished in 20–30 minutes, or even less. This rapid temperature increase may be followed by a period of soaking, but in most instances, this soaking period is of less importance than the rapid passing into the temperature range above about 1800° C. In the case of producing articles of high porosity where a metal instead of a metal oxide reactant is employed, as previously indicated the firing should be carried out under conditions of gradual temperature rise (25° C. per hour) up to 1300° C. before proceeding by a rapid increase to the final firing temperature.

It will be understood that certain variations in processing conditions are necessary to adjust the process to changes in composition; however, one skilled in the art will have no difficulties in making such adjustments.

The following table gives examples of combinations of materials which respond well to this process for producing dense carbide-bonded hard carbide or boride shaped articles. Many of these combinations can be considered as equivalents for purposes of this process, and their carbides or borides and oxides can be interchanged. Furthermore, some of the carbides form solid solutions with each other, so that also mixtures of carbides can be used in the process.

| Filler Material | Carbonized Bond | Oxide |
|---|---|---|
| TiC | C | $TiO_2$ |
| WC | C | $TiO_2$ |
| WC | C | $W_2O_3$ |
| TaC | C | $TiO_2$ |
| TaC | C | $Ta_2O_5$ |
| MoC | C | $TiO_2$ |
| MoC | C | $Mo_3O_5$ |
| VC | C | $TiO_2$ |
| VC | C | $V_2O_3$ |
| ZrC | C | $TiO_2$ |
| ZrC | C | $ZrO_2$ |
| $B_4C$ | C | [1] $B_2O_3$ |
| TiC | C | [1] $B_2O_3$ |
| $ZrB_2$ | C | [1] $B_2O_3$ |

[1] Vapor in He.

The following examples of initial molding compositions give a number of formulae in approximate parts by weight for providing the dense articles:

1.  ZrC ------------------------------------- 75.8
    Pitch ------------------------------------ 6.5
    Tar -------------------------------------- 3.3
    $TiO_2$ ---------------------------------- 14.4
2.  ZrC -------------------------------------- 116
    Pitch ------------------------------------ 10
    Tar -------------------------------------- 5
    $ZrO_2$ ---------------------------------- 21
3.  Wc -------------------------------------- 325
    $TiO_2$ ---------------------------------- 22
    Pitch ------------------------------------ 10
    Tar -------------------------------------- 5
4.  TiC -------------------------------------- 85
    $TiO_2$ ---------------------------------- 24
    Pitch ------------------------------------ 10
    Tar -------------------------------------- 5
5.  TaC -------------------------------------- 225
    $TiO_2$ ---------------------------------- 22
    Pitch ------------------------------------ 10
    Tar -------------------------------------- 5
6.  VC --------------------------------------- 97
    $TiO_2$ ---------------------------------- 22
    Pitch ------------------------------------ 10
    Tar -------------------------------------- 5
7.  TaC -------------------------------------- 225
    $Ta_2O_5$ -------------------------------- 32
    Pitch ------------------------------------ 10
    Tar -------------------------------------- 5
8.  VC --------------------------------------- 97
    $V_2O_3$ --------------------------------- 25
    Pitch ------------------------------------ 10
    Tar -------------------------------------- 5

For the purpose of determining the proper ratios of components of the initial composition, the yield of carbon from pitch and coke averages 40 percent, to which must be added the quantity of graphite which the carbide contains. This percentage of graphite in a rather pure carbide is about 1.5 percent, but it may be higher in some cases, and may be as high as 3.25 percent, as in the case of titanium carbide. The total free carbon is then related to the equivalent quantity of oxide in accordance with the following equation:

$$TiO_2 + 3C \xrightarrow{heat} 2CO + TiC$$

An analytical check on the content of carbon in the end product and corresponding adjustments in the content of oxide or in the choice of the oxide provide a simple means of controlling the initial composition.

From the above examples it can be seen that mixed carbides can be produced by use of a carbide filler with an oxide reactant of a different metal. It will also be seen that the carbides or borides when bonded with carbon and treated with boron oxide vapor (which may be carried by helium) follow the general pattern which gives the process a broad field of utility. A variation of the process is, for example, the bonding of a hard boride, such as titanium, zirconium, or hafnium boride, with carbon in the presence of boron and zirconium oxide. In an intermediate stage, boron carbide is formed, which at high temperatures is oxidized by the zirconium oxide while zirconium boride forms. If desired, this variation may also be carried out using boron carbide in the initial molding mixture rather than boron metal, thus eliminating the intermediate reaction to produce boron carbide. The following is an example of an initial molding composition in approximate parts by weight for the latter instance:

Parts
9.  $ZrB_2$ ----------------------------------- 100
    $ZrO_2$ ----------------------------------- 17.1
    $B_4C$ ------------------------------------ 3.85
    Tar --------------------------------------- 10

For producing less dense grains, in place of the oxide reactant, for example $TiO_2$, the corresponding metal powder can be used to absorb the bonding carbon by forming TiC. The following example is an illustration thereof:

Parts
10. TiC -------------------------------------- 85
    Pitch ------------------------------------ 9
    Tar -------------------------------------- 7
    Ti --------------------------------------- 24
           (—200 mesh)

The following example shows the fabrication of highly porous carbide shapes from merely a metal powder reactant and carbon:

Parts
11. Titanium powder, —200 mesh --------------- 80
    Powdered petroleum coke, degassed at 1000° C.,
        —200 mesh ---------------------------- 14
    Pitch, M. P. 300° F ---------------------- 10
    Coal tar, water free, sp. gr. 1.2 -------- 10

The ingredients are intimately mixed with the help of a solvent, such as toluene as previously described, and then formed. The molded shapes are coked and gradually heated to about 1300° C. in an inert or reducing atmosphere. The rate of heating is about 25° C. per hour throughout this heating cycle, but may be varied so long as the spontaneous reaction is not precipitated. At the indicated rate of heating the dissipation of the heat of reaction during carbide formation is faster than the generation of this heat and the self-accelerating explosive nature of the reaction remains checked. After this first heating cycle, the compacts are heated to about 1800° C. to 2500° C. to diffuse the metal and carbon completely and produce full homogeneity. The rate of heating in this case is not greatly important, although it may be just as fast as previously described. The shrinkage of the compacts is slight. Other metals besides titanium, or mixtures of metals may be used.

In instances it may be desired to employ the teachings of the present process wherein the carbon content of the filler may be excessive, so as to preclude the use of a carbonaceous temporary binder. In such instance a non-carbonaceous temporary binder may be employed, such as zirconium oxychloride. The hard boride or carbide filler is mixed with the zirconium oxychloride and heat treated in the same manner as the previous examples to provide a zirconium carbide bonded hard carbide or boride. In this case the binder also acts as the reactant and the molar quantity thereof in the mixture is chosen to substantially exactly consume the carbon of the filler in accordance with the following equations:

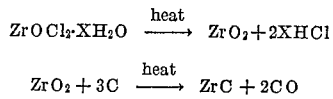

$$ZrOCl_2 \cdot XH_2O \xrightarrow{heat} ZrO_2 + 2XHCl$$

$$ZrO_2 + 3C \xrightarrow{heat} ZrC + 2CO$$

There is thus presented a process for manufacturing carbide-bonded or boride-bonded shaped hard carbide or boride articles by forming said bond in a shaped compact of the filler through chemical reaction of appropriate ingredients incorporated in the compact in proper chemical equivalents to substantially completely react in forming the bond, said ingredients being further chosen so that any other products of the reaction are readily removed from the compact, as for example gaseous products. Furthermore, this process enables the production of these articles with a high degree of dimensional accuracy and reducibility, and further enables the production of these articles with various and reproducible densities or porosities, as desired. In addition, the present invention provides various molding compositions appropriate for effecting the process. The detailed embodiment of the process and the various detailed examples of the molding compositions hereinabove stated are presented merely by way of example to enable a clear understanding of the present invention. Therefore, modifications of the teachings stated herein, as will be apparent to those skilled in the art, which are within the spirit and scope of the invention as defined by the appended claims are within the contemplation of the present patent.

The invention described herein may be manufactured and used by or for the Government of the United States of America for governmental purposes without the payment of any royalties thereon or therefor.

What is claimed is:

1. A process for fabrication of shaped carbide-bonded and boride-bonded carbide articles comprising dry mixing a powder filler chosen from the carbides and borides of the group consisting of titanium, zirconium, hafnium, thorium, vanadium, columbium, tantalum, chromium, molybdenum, and tungsten with a metal oxide of one of said group metals as a reactant and a carbonaceous temporary binder carbonizable in the range of 600–800° C., micropulverizing the dry mixture, mixing tar and a solvent for said tar and carbonaceous binder with said dry mixture to dissolve said tar and binder throughout the mixture, evaporating said solvent from the mixture, pulverizing the mixture of said filler, reactant, and binder in a dry state to pass a 100-mesh screen, plasticizing said mixture to a suitable viscosity for slip casting, slip casting the plasticized mixture to a desired shape, slowly heating the cast shape at 25° C. temperature rise per hour to approximately 500° C. and then at a 50° C. rise per hour to 600–800° C. to carbonize said binder and harden the shape for handling and machining, cooling said hardened shape, machining said shape by conventional means to a desired final shape, and heat treating the final shape to approximately 1800–2500° C. in 20 to 30 minutes in an inert atmosphere to react the constituents of said final shape to form carbides and borides of said group bonded to the carbide of the metal of said oxide.

2. A process for fabrication of shaped boride-bonded articles comprising dry mixing a powder filler chosen from the borides of the group consisting of titanium, zirconium, hafnium, thorium, vanadium, columbium, tantalum, chromium, molybdenum, and tungsten with a powder metal oxide of one of said group metal as a reactant and a carbonaceous temporary binder carbonizable in the range of 600–800° C.; mixing tar and a solvent for the tar with the filler, reactant, and binder; removing the solvent from the mixture; pulverizing the mixture; forming a desired shape from the pulverized tar, filler, reactant, and binder; slowly heating the shape at 25° C. temperature rise per hour to approximately 500° C. and then at 50° C. rise per hours to 600–800° C. to carbonize said binder and harden the shape for handling and machining; and heat treating the shape to 1800–2500° C. in 20 to 30 minutes in an inert atmosphere to react the constituents of said shape to form borides of said group metals bonded to the boride of the metal of said oxides.

References Cited in the file of this patent
UNITED STATES PATENTS

| | | |
|---|---|---|
| 2,109,246 | Boyer et al. | Feb. 22, 1938 |
| 2,141,617 | Ridgway | Dec. 27, 1938 |
| 2,228,871 | De Bats | Jan. 14, 1941 |

FOREIGN PATENTS

| | | |
|---|---|---|
| 491,659 | Great Britain | Sept. 6, 1938 |
| 570,805 | Great Britain | July 24, 1945 |
| 580,963 | Great Britain | Sept. 26, 1946 |
| 640,497 | Great Britain | July 19, 1950 |